Nov. 19, 1957 J. OSWALD 2,814,021
LADDER-TYPE BAND-PASS FILTERS
Filed May 5, 1953 6 Sheets-Sheet 1

INVENTOR:
JACQUES OSWALD
BY

Nov. 19, 1957    J. OSWALD    2,814,021
LADDER-TYPE BAND-PASS FILTERS
Filed May 5, 1953    6 Sheets-Sheet 2
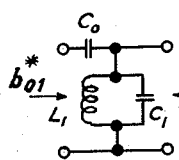
Fig. 4a
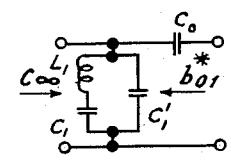
Fig. 4b
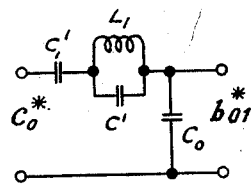
Fig. 4c
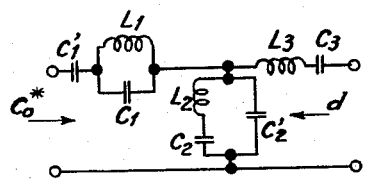
Fig. 5a
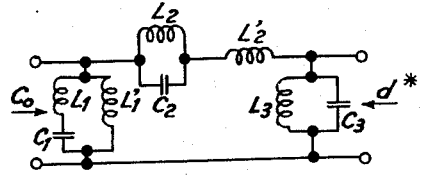
Fig. 5b
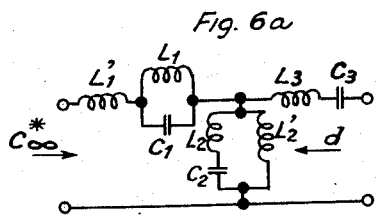
Fig. 6a
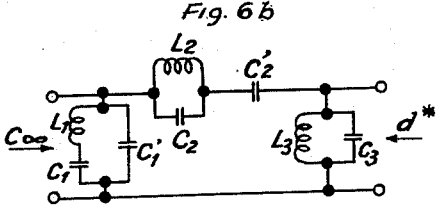
Fig. 6b
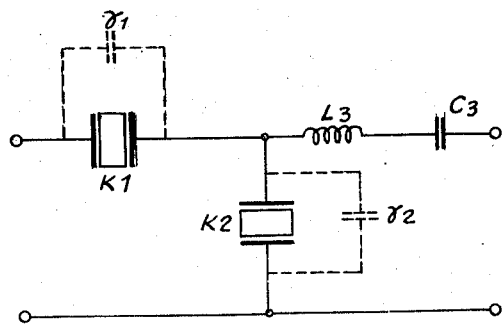
Fig. 5'a
INVENTOR:
JACQUES OSWALD
BY

Fig. 7a

NOTATIONS (TABLE n°1)

FUNCTION OF ATTENUATION $q$ $$q = \coth\theta = \sqrt{\frac{(p^2+\omega_{-1}^2)(p^2+\omega_1^2)}{p^2+\omega_a^2}}$$

IMPEDANCE FUNCTION $w_1, w_2$ $$w_1 = C_0 * \frac{\omega_\alpha^2 - \omega_0^2}{\omega_1 - \omega_{-1}} \cdot \frac{\sqrt{(p^2+\omega_{-1}^2)(p^2+\omega_1^2)}}{p(p^2+\omega_\alpha^2)}$$

$$w_2 = d = \mu \frac{\omega_0^2(\omega_1-\omega_{-1})}{(\omega_\alpha^2-\omega_0^2)(\omega_0^2-\omega_\infty^2)} \cdot \frac{(p^2+\omega_\alpha^2)(p^2+\omega_\infty^2)}{p\sqrt{(p^2+\omega_{-1}^2)(p^2+\omega_1^2)}}$$

$$\omega_0 = \sqrt{\omega_1 \omega_{-1}}, \quad m_0 = \frac{\omega_1}{\omega_0} = \frac{\omega_0}{\omega_{-1}} = \sqrt{\frac{\omega_1}{\omega_{-1}}}$$

$$\omega_\infty^2 = \frac{\omega_1^2 \omega_{-1}^2 - \omega_a^4}{\omega_1^2 + \omega_{-1}^2 - 2\omega_a^2} = \frac{(1-a^4)\omega_0^2}{m_0^2 + m_0^{-2} - 2a^2}$$

$$a^2 = \frac{\omega_a^2}{\omega_0^2} \qquad < 1$$

$$\Omega_\infty^2 = \frac{\omega_\infty^2}{\omega_0^2} = \frac{1-a^4}{m_0^2+m_0^{-2}-2a^2} < m_0^{-2}$$

$$\alpha^2 = \frac{\omega_\alpha^2}{\omega_0^2} > m_0^2, \quad = \frac{\omega_\beta^2}{\omega_0^2} = \frac{a^2\alpha^2-1}{\alpha^2+a^2-m_0^2-m_0^{-2}}$$

$$\mu = \left(\frac{\alpha^2-1}{\alpha^2-a^2}\right)^2 \left[1 + \frac{(1-a^2)^2}{(m_0-m_0^{-1})^2}\right]$$

$R$, CHARACTERISTIC CLOSING RESISTANCE
$\omega_{-1}, \omega_1$ PASS BAND FREQUENCY LIMITS
LOWER AND UPPER

INVENTOR:
JACQUES OSWALD
BY:

Nov. 19, 1957  J. OSWALD  2,814,021
LADDER-TYPE BAND-PASS FILTERS
Filed May 5, 1953  6 Sheets-Sheet 4

| $2MK'/c_0^* d \downarrow$ | TABLE n° 1 | |
|---|---|---|
| $L_1 \omega_0/R$ | $\dfrac{(\alpha^2-1)[\alpha^2+\alpha^{-2}m_0^2-m_0^{-2}]}{(m_0-m_0^{-1})\alpha^2(\alpha^2-a^2)}$ | $C_1 R\omega_0$ |
| $C_1 R\omega_0$ | $(m_0-m_0^{-1})\dfrac{(\alpha^2-a^2)}{(\alpha^2-1)[\alpha^2+\alpha^{-2}-m_0^2-m_0^{-2}]}$ | $L_1 \omega_0/R$ |
| $C'_1 R\omega_0$ | $(m_0-m_0^{-1})\dfrac{\alpha^2(\alpha^2-a^2)}{(\alpha^2-1)(a^2\alpha^2-1)}$ | $L'_1 \omega_0/R$ |
| $L_2 \omega_0/R$ | $\dfrac{(\alpha^2-1)(1-a^4)}{(m_0-m_0^{-1})(\alpha^2-a^2)\Omega_\infty^2(a^2\Omega_\infty^2)}$ | $C_2 R\omega_0$ |
| $C_2 R\omega_0$ | $(m_0-m_0^{-1})\dfrac{(\alpha^2-a^2)(a^2-\Omega_\infty^2)}{(\alpha^2-1)(1-a^4)}$ | $L_2 \omega_0/R$ |
| $C'_2 R\omega_0$ | $\dfrac{(\alpha^2-a^2)\Omega_\infty^2}{(\alpha^2-1)(1-a^4)}(m_0-m_0^{-1})$ | $L'_2 \omega_0/R$ |
| $L_3 \omega_0/R$ | $\dfrac{(\alpha^2-1)(1-a^4)}{(\alpha^2-a^2)^2\Omega_\infty^2}\dfrac{1}{m_0-m_0^{-1}}$ | $C_3 R\omega_0$ |
| $C_3 R\omega_0$ | $\dfrac{(\alpha^2-a^2)^2(m_0-m_0^{-1})}{(\alpha^2-1)(1-a^4)}$ | $L_3 \omega_0/R$ |
| $L_1 C_1$ | $\dfrac{1}{\omega_\alpha^2}$ | $L_1 C_1$ |
| $L_1(C_1+C'_1)$ | $\dfrac{1}{\omega_\beta^2}$ | $C_1(L_1+L'_1)$ |
| $L_2 C_2$ | $\dfrac{1}{\omega_\infty^2}$ | $L_2 C_2$ |
| $L_2 \dfrac{C_2 C'_2}{C_2+C'_2}$ | $\dfrac{1}{\omega_a^2}$ | $C_2 \dfrac{L_2 L'_2}{L_2+L'_2}$ |
| $L_3 C_3$ | $\dfrac{1}{\omega_\infty^2}$ | $L_3 C_3$ |
| | | $2MK'/c_0 d^* \uparrow$ |

Fig. 7

INVENTOR:
JACQUES OSWALD

| $2KM'/c_\infty^* d \downarrow$ | TABLE  n° 2 | |
|---|---|---|
| $L_1 \omega_0/R$ | $\dfrac{1}{m_0 - m_0^{-1}} \dfrac{(1-\alpha^2)(1-a^2\alpha^2)(\beta^2-\alpha^2)}{\alpha^2(a^2-\alpha^2)}$ | $C_1 R\omega_0$ |
| $C_1 R\omega_0$ | $(m_0 - m_0^{-1}) \dfrac{a^2 - \alpha^2}{(1-\alpha^2)(1-a^2\alpha^2)(\beta^2-\alpha^2)}$ | $L_1 \omega_0/R$ |
| $L'_1 \omega_0/R$ | $\dfrac{1}{m_0 - m_0^{-1}} \dfrac{(1-\alpha^2)(1-a^2\alpha^2)}{a^2-\alpha^2}$ | $C'_1 R\omega_0$ |
| $L_2 \omega_0/R$ | $\dfrac{1}{m_0 - m_0^{-1}} \dfrac{\Omega'^2_\infty (a^4-1)(1-\alpha^2)}{(\Omega'^2_\infty - a^2)(a^2-\alpha^2)}$ | $C_2 R\omega_0$ |
| $C_2 R\omega_0$ | $(m_0 - m_0^{-1}) \dfrac{(\Omega'^2_\infty - a^2)(a^2-\alpha^2)}{\Omega'^4_\infty (a^4-1)(1-\alpha^2)}$ | $L_2 \omega_0/R$ |
| $L'_2 \omega_0/R$ | $\dfrac{1}{m_0 - m_0^{-1}} \Omega'^2_\infty \dfrac{(a^4-1)(1-\alpha^2)}{a^2(a^2-\alpha^2)}$ | $C'_2 R\omega_0$ |
| $L_3 \omega_0/R$ | $\dfrac{1}{m_0 - m_0^{-1}} \dfrac{(a^4-1)\alpha^2(1-\alpha^2)}{(a^2-\alpha^2)^2}$ | $C_3 R\omega_0$ |
| $C_3 R\omega_0$ | $(m_0 - m_0^{-1}) \dfrac{(a^2-\alpha^2)^2}{\Omega'^2_\infty (a^4-1)\alpha^2(1-\alpha^2)}$ | $L_3 \omega_0/R$ |
| $L_1 C_1$ | $\dfrac{1}{\omega_\alpha^2}$ | $L_1 C_1$ |
| $\dfrac{L_1 L'_1}{L_1 + L'_1} C_1$ | $\dfrac{1}{\omega_\beta^2}$ | $L_1 \dfrac{C_1 C'_1}{C_1 + C'_1}$ |
| $L_2 C_2$ | $\dfrac{1}{\omega'^2_\infty}$ | $L_2 C_2$ |
| $(L_2 + L'_2) C_2$ | $\dfrac{1}{\omega_a^2}$ | $L_2 (C_2 + C'_2)$ |
| $L_3 C_3$ | $\dfrac{1}{\omega'^2_\infty}$ | $L_3 C_3$ |
| | | $2KM'/c_\infty^* d \uparrow$ |

NOTATIONS (TABLE n°2)

FUNCTION OF ATTENUATION $q$:

$$q = \coth \theta = a^2 \frac{\sqrt{(p^2+\omega_{-1}^2)(p^2+\omega_1^2)}}{p^2+\omega_a^2}$$

IMPEDANCE FUNCTION $w_1, w_2$ $$w_1 = C_\infty = \frac{\omega_0^2 - \omega_\alpha^2}{\omega_1 - \omega_{-1}} \frac{1}{\omega_0^2} \frac{p\sqrt{(p^2+\omega_{-1}^2)(p^2+\omega_1^2)}}{p^2+\omega_\alpha^2}$$

$$w_2 = d = \mu \frac{\omega_0^2(\omega_1-\omega_{-1})}{(\omega_0^2-\omega_\alpha^2)(\omega_\infty'^2-\omega_0^2)} \frac{(p^2+\omega_\alpha^2)(p^2+\omega_\infty'^2)}{p\sqrt{(p^2+\omega_{-1}^2)(p^2+\omega_1^2)}}$$

$$\omega_0 = \sqrt{\omega_1 \omega_{-1}}, \quad m_0 = \frac{\omega_1}{\omega_0} = \frac{\omega_0}{\omega_{-1}} = \sqrt{\frac{\omega_1}{\omega_{-1}}}$$

$$\omega_\infty'^2 = \frac{\omega_a^2(\omega_1^2+\omega_{-1}^2) - 2\omega_0^4}{\omega_a^4 - \omega_0^4} = \frac{(m_0^2+m_0^{-2}-2a^{-2})\omega_0^2}{1-a^{-4}}$$

$$a^2 = \frac{\omega_a^2}{\omega_0^2} \qquad\qquad > 1$$

$$\Omega_\infty'^2 = \frac{\omega_\infty'^2}{\omega_0^2} = \frac{m_0^2+m_0^{-2}-2a^{-2}}{1-a^{-4}} > m_0^2$$

$$\alpha^2 = \frac{\omega_\alpha^2}{\omega_0^2} < m_0^{-2}, \quad \frac{\omega_\beta^2}{\omega_0^2} = \frac{a^2+\alpha^2-a^2\alpha^2(m_0^2+m_0^{-2})}{1-a^2\alpha^2}$$

$$\mu = \left(\frac{1-\alpha^2}{a^2-\alpha^2}\right)^2 \frac{(a^4-1)(\Omega_\infty'^2-1)}{(m_0-m_0^{-1})^2} = \left(\frac{1-\alpha^2}{a^2-\alpha^2}\right)^2 \left[a^4 + \frac{(a^2-1)^2}{(m_0-m_0^{-1})^2}\right]$$

$R$, CHARACTERISTIC CLOSING RESISTANCE
$\omega_{-1}, \omega_1$ PASS BAND FREQUENCY LIMITS
LOWER AND UPPER

INVENTOR:
JACQUES OSWALD
BY:

United States Patent Office 2,814,021
Patented Nov. 19, 1957

2,814,021

LADDER-TYPE BAND-PASS FILTERS

Jacques Oswald, Paris, France, assignor to Compagnie Industrielle des Telephones, Paris, France, a corporation of France Application May 5, 1953, Serial No. 353,142

Claims priority, application France May 8, 1952

2 Claims. (Cl. 333—72)

The present invention relates to new cells for ladder-type band filters. It is well known that ladder-type filters can be obtained conveniently by arranging in cascade elementary filters, which are called cells or half-cells when they only have two arms.

The possibility of putting these elementary filters in cascade depends on the identity of the image impedances of the quadripoles which are being connected; in these conditions the attenuations on images of the component quadripoles are purely and simply added. The majority of semi-cells characteristic of band filters are well known and have already been described long before this. However, there are certain three-branch cells, form a T or π, which cannot be reduced to combinations of simple semi-cells and which are the object of the present invention.

First of all it is necessary to define the characteristic functions of ladder-type band filters and to indicate the corresponding notations.

$\theta$ will designate the image transfer exponent of a band filter. If the image attenuation, that is, the real portion of $\theta$, becomes infinite for a single frequency—real or complex—it can be shown that $\theta$ satisfies a relation of the type:

(1) $$[\coth \theta]^{\pm 1} = q = mm_0 \sqrt{\frac{p^2 + \omega_{-1}^2}{p^2 + \omega_1^2}}$$

in which $p$ is the complex pulsation $j\omega$, $\omega_{-1}$, $\omega_1$ the lower and upper cut-off frequencies, $m_0$ the quantity $$\frac{\omega_1}{\sqrt{\omega_1 \omega_{-1}}}$$

and $m$ a constant characteristic parameter of the peak of infinite attenuation.

We will then take the exponent $+1$:

(1a) $$\coth \theta = mm_0 \sqrt{\frac{p^2 + \omega_{-1}^2}{p^2 + \omega_1^2}}$$

In the case in which $m > m_0$, the peak of infinite attenuation is comprised between 0 and $\omega_{-1}$; it will be said that the function $q$ is of class 1M, the digit 1 indicating that there is only one frequency of infinite attenuation and the letter M indicating, by convention, that this frequency is comprised between 0 and $\omega_{-1}$.

If $m = m_0$, the frequency of infinite attenuation is at the origin and the function $q$ will be designated by 1K.

If we now take the exponent $-1$:

(1b) $$\coth \theta = \frac{1}{mm_0} \sqrt{\frac{p^2 + \omega_1^2}{p^2 + \omega_{-1}^2}}$$

and if $$m < \frac{1}{m_0}$$

the frequency of infinite attenuation is situated between $\omega_1$ and infinity; we shall then have a function which will be said to be of the type 1M'; finally with the same expression of $\theta$, but in which $$m = \frac{1}{m_0}$$

the point of infinite attenuation is shifted to infinity—it will be said that the function is of the class 1K'.

By suitably combining two functions of attenuation of the first order, we get a function of attenuation of the second order, which has two points of attenuation, and will have an expression of the form:

(2) $$[\coth \theta]^{\pm 1} = q = m \frac{p^2 + \omega_a^2}{\sqrt{(p^2 + \omega_{-1}^2)(p^2 + \omega_1^2)}}$$

in which $m$ is a characteristic parameter, and $\omega_a$ a frequency between $\omega_{-1}$ and $\omega_1$, that is, in the pass band. The sign $+$ corresponds to the combination of two functions of the same type, $1^a$ or $1^b$, the sign $-$ to the combination of two functions of different types. According to the positions of the frequencies of infinite attenuation, the functions of attenuation of the second order will be designated by $2M^2$, $2K^2$, $2M'^2$, $2K'^2$, $2KM$, $2M'K'$, $2MM'$, $2MK'$, $2KM'$, $2KK'$.

For the five first functions the exponent $+1$ must be chosen:

(2a) $$\coth \theta = q = \frac{m(p^2 + \omega_a^2)}{\sqrt{(p^2 + \omega_{-1}^2)(p^2 + \omega_1^2)}}$$

$m$ and $\omega_a$ having suitable values which will not be specified at the moment. For the five last functions the exponent $(-1)$ must be taken:

(2b) $$\coth \theta = \frac{1}{m} \frac{\sqrt{(p^2 + \omega_{-1}^2)(p^2 + \omega_1^2)}}{(p^2 + \omega_a^2)}$$

These results being remembered we will now pass on to the impedance functions.

The simplest image-impedance function of the band filters may be written in the following form:

(3) $$(W)^{\pm 1} = \mu \frac{(\omega_1 - \omega_{-1})p}{\sqrt{(p^2 + \omega_{-1}^2)(p^2 + \omega_1^2)}}$$

in which $\mu$ is any positive constant. The impedance said to be of type $b$ corresponds to the value $+1$ of the exponent; the inverse impedance designated by $b^*$ corresponds to the value $-1$.

$b$, $b^*$ are impedances of the second order.

The impedances of the fourth order are of the form:

(4)

$$(W)^{\pm 1} = \frac{\mu}{p} \frac{\omega_0^2(\omega_1 - \omega_{-1})}{(\omega_{a'}^2 - \omega_0^2)(\omega_0^2 - \omega_a^2)} \frac{(p^2 + \omega_a^2)(p^2 + \omega_{a'}^2)}{\sqrt{(p^2 + \omega - 1^2)(p^2 + \omega_1^2)}}$$

in which $$\omega_0 = \sqrt{\omega_1 \omega_{-1}}$$

$\omega_{a'}$ being a frequency in the upper attenuated band, $\omega_a$ a frequency in the lower attenuated band. According to whether the value $+1$ or $-1$ were chosen for the exponent we have the types of impedances $d$ or $d^*$.

Fig. 2a represents a T semi-cell consisting of the simplest filter ($2KK'bb^*$), hereinafter called a classic cell.

Fig. 2b represents a T semi-cell ($2MM'b^*d$) called a derivative in MM' of the preceding semi-cell shown in Fig. 2a.

Fig. 2c illustrates a semi-cell which is the inverse network of the cell shown in Fig. 2b.

Figs. 4a, 4b and 4c show three simple classical semi-cells having degenerate impedances.

Figs. 5a and 5b respectively represent an elementary filter embodying the principles of the present invention and having the impedance variation $(2MK'/C_0{}^*d)$ and its inverse.

Fig. 5a' is an electrical schematic diagram of the filter incorporating the principles of the present invention and utilizing piezo-electric resonators.

Fig. 6a represents the elementary filter $(2KM'/C_\infty{}^*d)$ and Fig. 6b represents its inverse.

Fig. 7 is a table giving the values of the elements of the filters illustrated in Figs. 5a and 5b.

Fig. 7a is a table of notations showing the values of the symbols used in Fig. 7.

Fig. 8 is a table giving the values of the elements of the filters illustrated in Figs. 6a and 6b.

Fig. 8a is a table of notations showing the values of the symbols used in Fig. 8.

Figure 1:
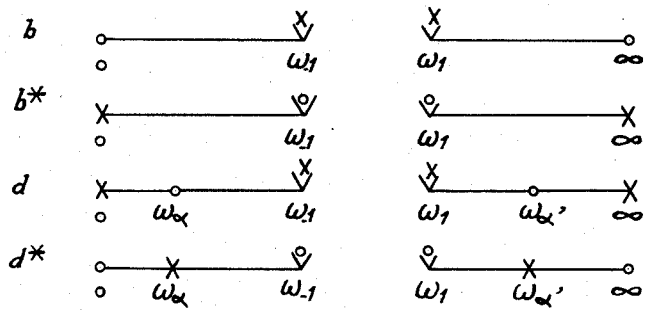
Fig. 1 represents the impedances $b$, $b^*$, $d$, $d^*$, the zeroes of the image impedance being designated by a small circle, the poles by a cross and the branching points by a V.
Figures 2A, 2B, 2C:
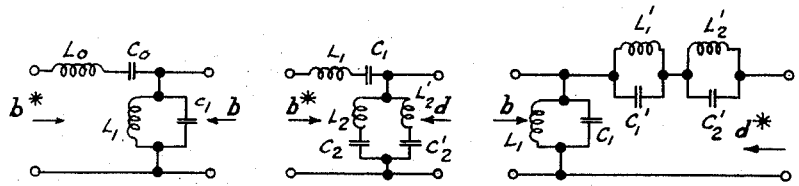

The filter section of Fig. 2b has a horizontal branch consisting of a resonant circuit having the impedance variation illustrated in $b^*$ of Fig. 1. This horizontal branch is formed by the elements $L_1$ and $C_1$. The vertical branch is formed with two resonant circuits in parallel and consists of the elements $L_2$, $C_2$ and $L'_2$, $C'_2$.

The filter network illustrated in Fig. 2c includes a vertical branch consisting of an anti-resonant circuit $L_1$ and $C_1$ having the impedance variation illustrated in $b$ of Fig. 1 and a horizontal branch consisting of two anti-resonant circuits in series formed by the elements $L'_1$, $C'_1$ and $L'_2$, $C'_2$. The horizontal branch has the impedance variation illustrated in $d^*$ of Fig. 1.

If we refer to Fig. 1, however, it will be seen that the impedances of the fourth order $d$, $d^*$ may show cases of degeneration. These are the cases in which the frequencies $\omega_a$, $\omega_{a'}$ are merged with the frontiers (0, $\omega_{-1}$, $\omega_1$ $\infty$).

An index $(i)$ will designate the degeneration such that $\omega_a$ or $\omega_{a'}$ becomes merged with the frequency $\omega_1$. Furthermore, the letter chosen to represent the impedance is characteristic of the degree of this impedance (degree of the rational fraction $W^2$ considered as function of $\omega^2$).

For example, $C_\infty$ designates the impedance of the third order obtained from the impedance of the fourth order $d$, when the frequency $\omega_{a'}$ tends to infinity; $C_{-1}$ designates the impedance obtained from $d$ when $\omega_a$ is merged with $\omega_{-1}$; $b_{-1}$, represents the impedance uniting these characters.

Figure 3:
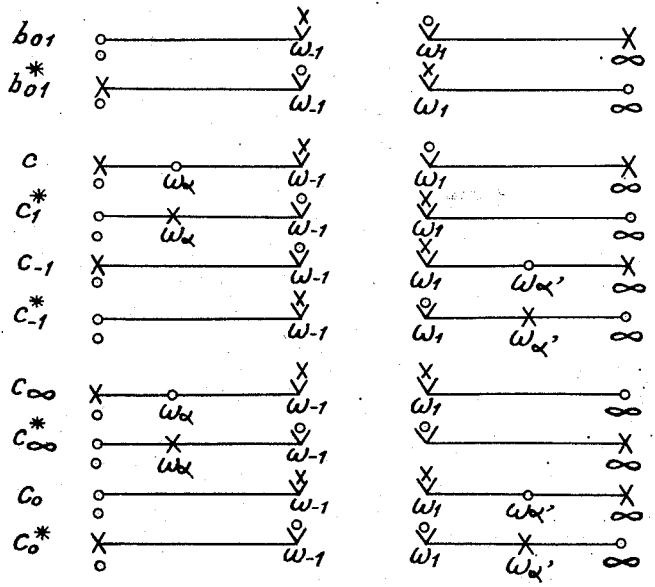
Fig. 3 illustrates the impedances of the second and third order obtained by degeneration of the impedance of the fourth order $d$.

Referring now to Fig. 3 the impedances of the second and third order obtained by degeneration of the impedance of the fourth order $d$ are represented.

Their expression is as follows:

$$b_{0,1}/W = \frac{p}{\omega_1}\sqrt{\frac{p^2+\omega_1^2}{p^2+\omega_{-1}^2}}$$

$$C_1/W = \frac{\omega_{-1}}{\omega_0^2-\omega_a^2}\frac{p^2+\omega_a^2}{p}\sqrt{\frac{p^2+\omega_1^2}{p^2+\omega_{-1}^2}}$$

$$C_{-1}/W = \frac{\omega_1}{\omega_a^2-\omega_0^2}\frac{p^2+\omega_{a1}^2}{p}\sqrt{\frac{p^2+\omega_{-1}^2}{p^2+\omega_1^2}}$$

$$C_\infty/W = \frac{(\omega_1-\omega_{-1})\omega_0^2}{\omega_0^2-\omega_a^2}\frac{p^2+\omega_\infty^2}{p\sqrt{(p^2+\omega_{-1}^2)(p^2+\omega_1^2)}}$$

$$C_0/W = \frac{\omega_1-\omega_{-1}}{\omega_{a'}^2-\omega_0^2}\frac{p(p^2+\omega_{a'}^2)}{\sqrt{(p^2+\omega_{-1}^2)(p^2+\omega_1^2)}}$$

The impedances $b_{0,1}{}^*$, $C_1{}^*$, $C_{-1}{}^*$, etc. are obtained by substituting $W^{-1}$ for $W$ (thus $b_{0,1}{}^*=b_{-1}$, ).

Fig. 4 shows three simple classical semi-cells having degenerate impedances. With the notations used, Fig. 4a represents the filter $(1K/b_{01}{}^*b)$ which is a T semi-cell having a capacity $C_0$ in the horizontal branch thereof and an anti-resonant circuit $(L_1, C_1)$ in its vertical branch, Fig. 4b the filter $(1M/b_{0,1}{}^* C_\infty)$ which is a T semi-cell having a capacity $C_0$ in its horizontal branch with an impedance variation illustrated in $b_{01}{}^*$ and a vertical branch comprising a resonant circuit $L_1$, $C_1$ in parallel with a capacitor $C_1'$ or the equivalent piezo-electric resonator and Fig. 4c the filter $(1M'/C_0{}^*\ b_{01}{}^*)$ having a vertical branch with a capacity $C_0$ with the impedance variation illustrated in $b_{01}{}^*$ and a horizontal branch consisting of a capacitor $C_1'$ in series with an anti-resonant circuit $(L_1, C_1)$.

If any two impedances $W_1$, $W_2$, are chosen from the impedances of the first and second order (degenerate or not) it can be proved that there is always an infinity of filters of which the image impedances are $W_1$, $W_2$. Among all these filters there is one of which the class of attenuation is lower in degree than all the others. A filter of this kind will be termed "elementary." The classical semi-cells of the band-filters are elementary filters. For certain associations of impedances the elementary filter is formed of two semi-cells of a simpler type; for example, the elementary impedance filter $W_1=b_{0,1}{}^*$, $W_2=C_{-1}$ is of class 2; it is the filter $$(2K'M'/b_{0,1}{}^*C_{-1})$$

which can be obtained by simple combination of the semi-cells $(1K'/b_{0,1}{}^*b^*)$ and $(1M'/b^*C_{-1})$.

On the other hand there are certain associations of impedances of the second order such that the corresponding elementary filter is composed of a T- or $\pi$ type network of class 2, which network cannot be decomposed into simpler semi-cells.

The present invention is particularly concerned with two of these structures and their inverses which may be designated as follows with the notations adopted: structure $(2MK'/C_0{}^*d)$ and its inverse $(2MK'/C_0d^*)$ on the one hand, structure $(2KM'/C_\infty{}^*d)$ and its inverse $$(2KM'C_\infty d^*)$$

on the other hand.

It will be noted that the structures of the second line are obtained from those of the first by substituting $1/p$ for $p$ in its component elements.

As, moreover, the passage from a T (or $\pi$) cell to a $\pi$ (or T) cell inverse to the foregoing by substitution of inverse branches in the second structure, is well known, it will be sufficient to show that, for example, the T-type cell: $(2MK'/C_0{}^*d)$ cannot be decomposed into matched semi-cells.

The decomposition of said cell would require, in effect, the use of semi-cells:

$$1K'/C_0{}^*W_2, 1M/dW_2$$

or $$1K_2/dW_2, 1M/C_0{}^*W_2$$

$W_2$ designating a common image impedance.

It is, however, easy to see that there is no semi-cell of the types:

$$1K'/C_0{}^*, 1K'/d$$

Type $1K'/C_0{}^*$ $$W_1 = C_0{}^* = \frac{\sqrt{(p^2+\omega_{-1}^2)(p^2+\omega_1^2)}}{\mu p(p^2+\omega_{a'}^2)}, \quad q = \sqrt{\frac{p^2+\omega_1^2}{p^2+\omega_{-1}^2}}$$

The vertical branch should have as impedance:

$$\frac{C_0{}^* q}{q^2-1} = \frac{(p^2+\omega_1^2)(p^2+\omega_{-1}^2)}{p(\omega_1^2-\omega_{-1}^2)(p^2+\omega_{a'}^2)}$$

which is impossible by reason of the position of the zeros and the poles.

Type $1K'/d$ $$W_1 = d = \frac{\mu}{p}\frac{(p^2+\omega_a^2)(p^2+\omega_{a'}^2)}{\sqrt{(p^2+\omega_{-1}^2)(p^2+\omega_1^2)}}$$

$$q = \sqrt{\frac{p^2+\omega_1^2}{p^2+\omega_{-1}^2}}$$

The vertical branch of the semi-cell should have as impedance:

$$d\frac{q^2-1}{q} = \frac{\mu}{p} \frac{(p^2+\omega_\alpha^2)(p^2+\omega_{\alpha'}^2)}{(p^2+\omega_{-1}^2)(p^2+\omega_1^2)}$$

which again is impossible owing to the non-alternation of the poles and the zeros.

It will be remembered that the knowledge of the image-impedance functions $W_1$, $W_2$ and of the attenuation function $q$ determines in an unique manner the branches of the corresponding T (or $\pi$) type cell, if such there be.

It is known, in effect, for example, that if $W_1$, $W_2$ and $q$ respectively represent the image impedances and the attenuation function of a T-type reactive cell, and if W is the geometrical mean of the impedances;

$$W = \sqrt{W_1 W_2}$$

the vertical branch of the T has as a reactance: $W\sqrt{q^2-1}$ and the horizontal branches respectively have as reactances $$W_1 q - W\sqrt{q^2-1}, \; W_2 q - W\sqrt{q^2-1}$$

The three branches of the T-structure are therefore defined and can be obtained by the known methods of constructing reactances.

Referring to Fig. 5, the filter 5a has a point of infinite attenuation for the frequency of resonance $\omega_a$ of the resonant circuits $L_2C_2$ and $L_3C_3$ and a point of attenuation at the infinite frequency. Its impedance regarded from the left side is the impedance $C_0^*$ of the classic cell of Fig. 4c, its impedance regarded from the right-hand side that of the classic cell of Fig. 2b. Table No. 1 gives the exact value of the elements of this filter in the left hand column. The right hand column gives the value of the elements of the cell illustrated in Fig. 5b (2MK'/$C_0 d^*$), and which is obtained by replacing each of the impedances in the left hand column by its inverse and multiplying by $R^2$.

Figure 5a' represents the same type of filter as in Figure 5a with piezo-electric resonators substituted for some of the inductive and capacitive elements of the filter. The piezo-electric resonator K1 is arranged in the series branch while the piezo-electric resonator K2 is arranged in the diagonal branch. The dotted lines and capacitors respectively connected in parallel with the piezo-electric resonators K1 and K2 represent shunt capacitors $\gamma_1$ and $\gamma_2$ which may be connected in parallel if desired.

Fig. 6a represents the elementary filter (2KM'/$C_\infty^* d$), Fig. 6b its inverse. Filter 6b for example has a point of infinite attenuation at zero frequency, another at the frequency $\omega_{a'}$ of anti-resonance of the stopper circuits $L_2C_2$ and $L_3C_3$.

The impedance regarded from the left is the impedance $C_\infty$ of the filter of Fig. 4b, and that seen from the right is the impedance $d^*$ of the filter of Fig. 2c.

Table No. 2 gives the exact value of the elements of this filter in the left hand column. The right hand column gives the elements of the cell illustrated in Fig. 6b.

All these filters, which cannot be obtained by simple combination of known cells, have the remarkable property of having on one side an undegenerate impedance of the fourth order with a more simple termination than the classic semi-cells of Figs. 2b and 2c. In effect the terminal impedance $(d)$ of the filter of Fig. 5a is a series-resonant circuit $L_3C_3$, while that of the filter of Fig. 2b comprises two resonant circuits in parallel.

Another property of the filters of Figs. 5a and 6 is that of being directly connected to the cells of Figs. 4c and 4b, which are much used because they are economical.

On the other hand the classic cells of Figs. 2b and 2c are only connected to cells having an impedance of the second order. Finally, the structures of Figs. 5a and 6b, which only comprise three inductances, are particularly to be recommended when the price of the capacities is clearly lower than that of the inductances. They can provide terminations having a regular impedance, and on the other hand can be interconnected to form a composite filter having a regular input impedance and a high degree of attenuation.

Moreover the cells 2MK'/$c_0^* d$ and 2KM'/$c_\infty d^*$ each have two arms formed by placing a stopper circuit and a capacity in series (equivalent to placing a resonant circuit and a capacity in parallel).

It is known that these structures can, in certain cases be obtained by a piezo-electric crystal (for example of quartz) possibly completed by a capacity.

The present invention provides for the use in filters with relatively narrow band, of the cells 2MK'/$c_0^* d$ and 2KM'/$c_\infty d^*$, each produced by means of two piezo-electric resonators and an ordinary stopper circuit (or a resonant circuit) for the third arm of the cell.

This form is possible, because the orders of magnitude of the various elements for a rather high nominal impedance and a relative band width not exceeding a few hundredths are quite suitable—which is not always the case with the known types of ladder-type semi-cells.

What is claimed is:

1. An asymmetrical T-type filter cell with a single pass band limited by a lower cut-off frequency $f_{-1}$ and a higher cut-off frequency $f_1$, comprising a horizontal branch including a resonant circuit having a resonance frequency $f_\infty$ lower than $f_{-1}$; a vertical branch including a capacitor in parallel with a resonant circuit having the same resonance frequency $f_\infty$; a second horizontal branch including a capacitor in series with an anti-resonant circuit tuned to a frequency $f$ higher than $f_1$ said filter cell having the following: (a) an "image transfer constant" $\theta$ so that $\coth^2\theta$ is a rational fraction of the second degree in $p^2$, $p$ standing for the quantity $2\pi jf$, where $f$ is the frequency of the current applied to the cell, said fraction having a value equal to 1 when the said frequency $f$ becomes infinite, and also when $f$ has the value $f_\infty$; (b) an image impedance which when squared is a rational fraction in the fourth degree in $p^2$, the said fraction having an infinite value when the frequency $f$ has one of the following values: 0, $f_{-1}$, $f_1$, $\infty$ and having a zero value when the frequency is equal to $f_\infty$ or to $f^{\infty'}$; (c) a second image impedance which when squared is a rational fraction in the third degree in $p^2$, the said fraction having an infinite value when the frequency $f$ is equal to 0 or $f_\infty'$, and having a zero value when the frequency $f$ becomes equal to $f_{-1}$ or to $f_1$.

2. A cell in accordance with claim 1 having a relatively narrow pass band and a high impedance, including piezo-electric resonators in two of its branches and a resonant circuit in the third branch.

References Cited in the file of this patent

UNITED STATES PATENTS

| | | |
|---|---|---|
| 1,795,204 | Espenshied | Mar. 3, 1931 |
| 2,591,838 | Leroy | Apr. 8, 1952 |
| 2,619,535 | Prior et al | Nov. 25, 1952 |
| 2,762,018 | Purington | Sept. 4, 1956 |